W. E. DICKSON.
Churns.
No. 156,336.  Patented Oct. 27, 1874.
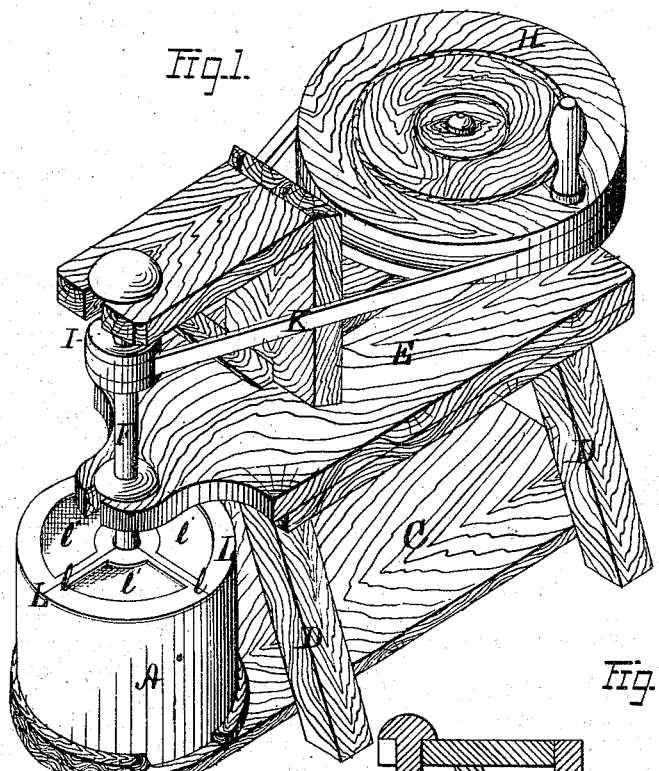
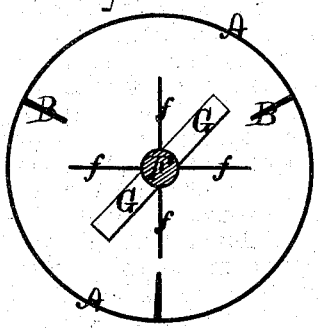
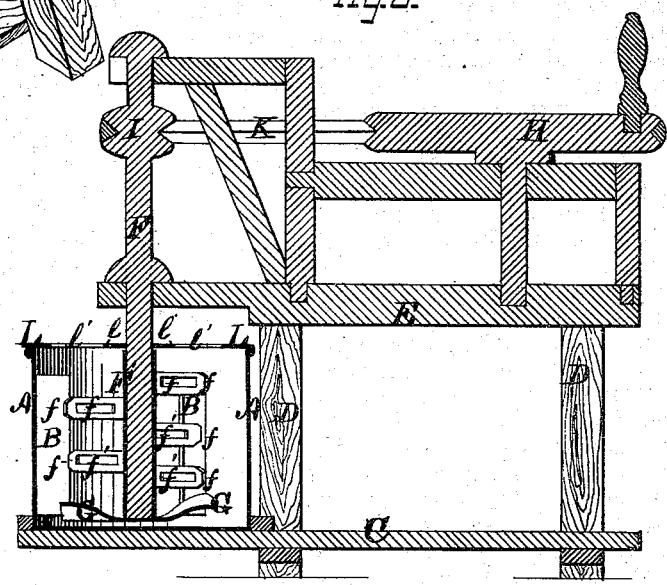
Witnesses:
Jas. E. Hutchinson
John R. Young
Inventor:
William E. Dickson, by
Prindle and Deane, his Attys

UNITED STATES PATENT OFFICE.

WILLIAM EARLY DICKSON, OF ATLANTA, GEORGIA, ASSIGNOR OF ONE-HALF HIS RIGHT TO ANNIE E. ANSLEY, OF SAME PLACE.

IMPROVEMENT IN CHURNS.

Specification forming part of Letters Patent No. 156,336, dated October 27, 1374; application filed August 29, 1874.

*To all whom it may concern:*

Be it known that I, WM. EARLY DICKSON, of Atlanta, in the county of Fulton and in the State of Georgia, have invented certain new and useful Improvements in Churns; and do hereby declare that the following is a full, clear, and exact description thereof, reference being had to the accompanying drawings, making a part of this specification, in which—

Figure 1 is a perspective view of my improved machine as arranged for use. Fig. 2 is a vertical longitudinal section of the same upon a central line; and Fig. 3 is a horizontal section of the churn and dasher.

Letters of like name and kind refer to like parts in each of the figures.

The design of my invention is to enable butter to be produced from cream with greater facility and in less time than has heretofore been required; and to this end it consists in combining, with a horizontally-rotating dasher arranged to revolve within an inclosing reservoir, one or more radial blades, which are curved horizontally, and, when in motion, move the cream in a vertical direction, substantially as and for the purpose hereinafter shown.

In the annexed drawing, A represents a reservoir for containing cream, constructed, preferably, in a cylindrical form with its upper end open, and provided upon its inner side with a number of radial vertical wings, B and B. The reservoir described is placed upon a suitable supporting shelf, C, that is secured to and forms part of a table or frame, D, E, and E, which is used for sustaining the operative mechanism, and within said frame, immediately over said reservoir, is journaled a shaft, F, that extends downward within and nearly to the bottom of the latter. At suitable points upon the portion F' of the shaft F that is contained within the reservoir A are secured a number of radial arms, $f$ and $f$, which arms are flat and arranged in vertical planes, and are each provided with a central opening, $f'$, as shown in Fig. 2. Upon the lower end of the shaft or dasher F' are secured one or more flat blades, G, which, at their point of attachment to said dasher, are placed edgewise to the plane of motion, and from thence outward are twisted like the blades of a propeller. The shaft F is rotated by means of a band-wheel, H, which is journaled upon the rear portion of the frame, and is connected with a pulley, I, upon said shaft by means of a belt, K, that encircles said wheel and pulley.

If, now, the churn or reservoir A be partially filled with cream, and the dasher F' caused to revolve, the open blades $f$ and $f$ will thoroughly agitate said cream and rupture the globules of butter, while the lower curved blade G will cause the liquid contents of said churn to move vertically, so as to bring each portion thereof into contact with said beaters.

The office of the wings B and B is to retard the circular movement of the cream within the churn, and prevent the same from being carried around with the dasher, as would otherwise be the case.

In order that the cream may be prevented from spattering outward, and at the same time a view of the interior of the churn may be had, the upper end of the latter is inclosed by means of a cover, L, which is constructed of metal, and, for convenience of removal, is made in two sections. Within the upper side of the cover L are formed a number of openings, $l$ and $l$, that are each inclosed by means of a glass plate, $l'$, through which plates the interior of the churn can be plainly seen and the condition of its contents known as the process of separating the butter is carried on.

Having thus fully set forth the nature and merits of my invention, what I claim as new is—

In combination with a horizontally-rotating dasher, F', $f$, and $f'$, arranged to revolve within an inclosing reservoir, A, of one or more radial blades, G, curved horizontally, substantially as and for the purpose shown.

In testimony that I claim the foregoing I have hereunto set my hand this 8th day of August, 1874.

WM. EARLY DICKSON.

Witnesses:
JAS. J. BARNES,
J. M. PATTON.